(12) United States Patent
Satoyama et al.

(10) Patent No.: US 6,516,385 B1
(45) Date of Patent: Feb. 4, 2003

(54) DATA SHARING METHOD AND SYSTEM BETWEEN INFORMATION PROCESSING SYSTEMS WITH VARIABLE LENGTH BLOCK FORMAT TO FIXED LENGTH BLOCK FORMAT CONVERSION

(75) Inventors: Ai Satoyama, Kokubunji (JP); Akira Yamamoto, Sagamihara (JP); Takahiko Shoyama, Hadano (JP); Yasutomo Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/477,713

(22) Filed: Jan. 5, 2000

(30) Foreign Application Priority Data

Jan. 6, 1999 (JP) .......................................... 11-000875

(51) Int. Cl.⁷ ............................................. G06F 12/00
(52) U.S. Cl. .......................... 711/112; 711/147; 360/48
(58) Field of Search .................... 711/111, 112, 147, 711/154, 4, 118, 162; 360/48, 71, 135

(56) References Cited

U.S. PATENT DOCUMENTS

| | | | | |
|---|---|---|---|---|
| 5,734,818 A | * | 3/1998 | Kern et al. .................... 714/20 |
| 5,758,125 A | * | 5/1998 | Misinai et al. ................. 703/23 |
| 5,920,893 A | * | 7/1999 | Nakayama et al. .......... 711/147 |
| 5,968,182 A | * | 10/1999 | Chen et al. ..................... 714/5 |
| 6,041,386 A | * | 3/2000 | Bello ............................. 711/4 |
| 6,041,391 A | * | 3/2000 | Kanda et al. ................. 711/112 |
| 6,115,797 A | * | 9/2000 | Kanda et al. ................. 711/147 |
| 6,173,377 B1 | * | 1/2001 | Yanai et al. .................. 711/162 |
| 6,219,751 B1 | * | 4/2001 | Hodges ........................ 711/114 |

FOREIGN PATENT DOCUMENTS

EP            785500 A1 *  7/1997   ............. G06F/3/06

OTHER PUBLICATIONS

"MainFrame '98", Nikkei BP, pp. 53–54 & 126–130.
"M–Series Processing System (M/ASA Mode) Manual", Hitachi, Ltd. Document No. 8080–2–146.
"H–6582–C3 Model Disk Control Unit Manual", Hitachi, Ltd. Document No. 8080–2–130–60.

* cited by examiner

*Primary Examiner*—Hong Kim
(74) *Attorney, Agent, or Firm*—Mattingly Stanger & Malur, P.C.

(57) ABSTRACT

A data sharing method and system between information processing systems which enable an information processing system to share data in an internal disk unit possessed by another information processing system. A disk control unit within the other information processing system having an external disk unit or an external disk unit includes a disk data sharing mechanism for creating a read/write request to the internal or external disk unit from a command equivalent to a read/write request to a data in a conventional disk subsystem. This mechanism emulates a CCW command to access data in the disk unit.

10 Claims, 9 Drawing Sheets

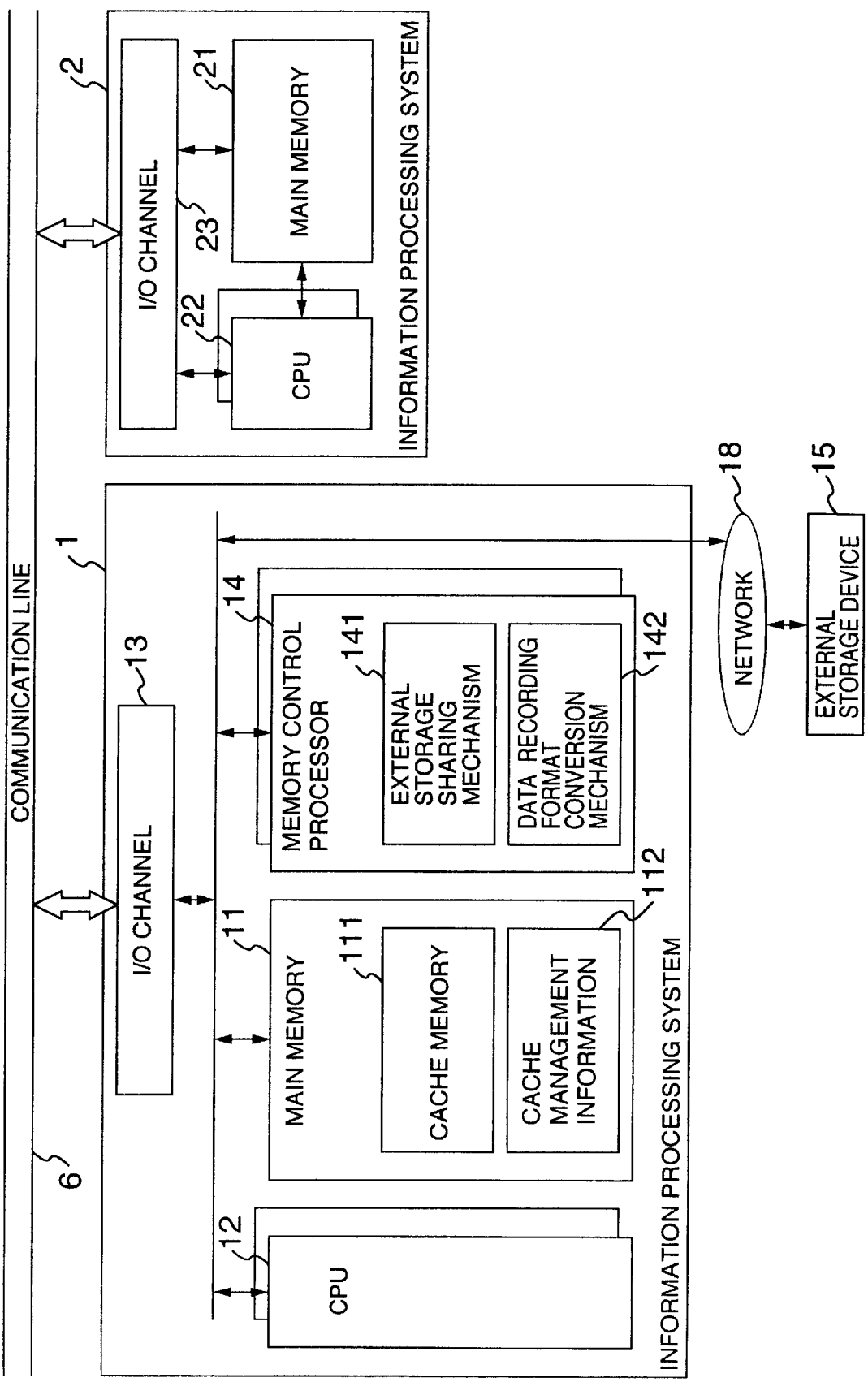

DATA SHARING METHOD AND SYSTEM BETWEEN INFORMATION PROCESSING SYSTEMS WITH VARIABLE LENGTH BLOCK FORMAT TO FIXED LENGTH BLOCK FORMAT CONVERSION

BACKGROUND OF THE INVENTION

The present invention relates generally to a data sharing method and system between information processing systems, and more particularly to a data access method and apparatus for use in a computer system comprising an information processing system and another information processing system having an internal auxiliary storage device connected thereto for accessing the internal auxiliary storage device from any information processing system.

A general-purpose large computer (or a main frame which is hereinafter referred to as the "information processing system") typically employs variable length block format magnetic disk units as external storage devices. To access such a magnetic disk unit, a variable length access interface (for example, CKD (Count Key Data)) is employed for enabling data accesses in variable length block format. Conventionally, variable-length block formatted data have been physically implemented on a disk unit having this variable length access interface. In recent years, however, disk arrays composed of relatively inexpensive disk units generally used for PC and workstations have been widespread as storage devices for variable-length block formatted data.

In regard to a disk array for use with a general-purpose information processing system, disk units conforming to a fixed length block format referred to as FBA (Fixed Block Architecture) are typically used for individual disk units, as-found in a literature "Main Frame '98," published by Nikkei BP, pp. 126–130. Then, an associated disk array controller has a fixed length/variable length block format conversion function, so that an information processing system is connected to the disk controller through a variable length access interface, for example, a SCSI (Small Computer Interface) interface. A read/write request from an information processing system, such as that issued from an operating system, is composed of a plurality of input/output commands referred to as CCWs (Channel Command Words). The plurality of CCWs are referred to as a "CCW chain." The CCW chain is created by the operating system of the information processing system in accordance with a request from an application program.

A magnetic disk drive is typically utilized as a disk subsystem comprising a disk control unit and disk units, which is mounted external to an information processing system. When the information processing system reads/writes data from/into a disk unit, the information processing system first sends a command conforming to a variable length block format to the disk subsystem. The disk control unit disposed in the disk subsystem receives the command issued by the information processing system, and converts the command from the variable length block format to a fixed length block format such that the disk unit can be accessed by this command (disclosed in JP-A-6-150557).

FIG. 2 illustrates an information processing system which has an external disk subsystem connected thereto. The information processing system 3 is connected to the disk subsystem 4 through a communication line 34. The information processing system 3 is provided with a plurality of I/O channels 33 for controlling transmission/reception of information to/from external devices in place of the information processing system 3. One of the I/O channels 33 is connected to the disk subsystem 4 which comprises a disk controller 41 and a plurality of fixed length block format disk units 42 operating under the control of the disk controller 41. A variable length access interface is included in the disk controller 41. The I/O channels 33 constitute a variable length access interface. The disk controller 41 has a function of performing conversion between the variable length block format and the fixed length block format. Each of the disk units 42 is accessed through a fixed length access interface.

Now, a conventional method of accessing data from the information processing system to the disk subsystem will be described in connection with data read/write operations with reference to a flow chart of FIG. 6.

Step 601: For accessing data stored in a disk unit 42, a CPU 32 creates a read/write request as a CCW for controlling the data and the disk unit through an operating system running on the CPU 32, and stores the read/write request in a main memory 31. The CPU 32 initiates the associated I/O channel 33 to start the read/write request. After this processing, the CPU 32 is released for performing other processing.

Step 602: The I/O channel 33 issues the read/write access to the disk controller 41 to initiate the disk unit 42.

Step 603: The I/O channel 33 regards the plurality of disk control units 42 under the control of the disk control unit 41 as conforming to a variable length block format based on a count-key-data (CKD) architecture, and issues the variable-length formatted CCW residing on the main memory 31 to the disk controller 41.

Step 604: The disk controller 41 converts the variable-length block formatted CCW to a fixed length block formatted counterpart, i.e., a SCSI command.

Step 605: After converting the CCW to the SCSI command, the disk controller 41 sends the command to the plurality of subordinate disk units 42 for controlling them to perform a seek operation to position their respective heads over target records. For a data read, requested data is read from the disk unit 42, transferred through the disk controller 41 and the I/O channel 33, and written into the main memory 31. For a data write, data on the main memory 31 is read, and a write request is issued to the disk controller 41.

Step 606: When the data transfer is completed, the I/O channel 33 generates an interrupt to the CPU 32 to inform the same of the completion of the data transfer, thus terminating the I/O operation.

The sequence of I/O operations mentioned above is described in "M-series Processing System (M/ASA Mode) Manual" (document number 8080-2-146) published by Hitachi Ltd. and "H-6582-C3 Model Disk Control Unit Manual" (document number 8080-2-130-60) also published by Hitachi Ltd.

A prior art internal disk is described, for example, in "Main Frame '98" published by Nikkei BP, pp. 53–54. This literature discloses a technique for installing a fixed length block format disk within a chassis of an information processing system. Specifically, a fixed length block format disk is directly connected to a processor within the information processing system, such that the processor interprets a CCW chain generated by an operating system, referred to as "SAP" (System Assist Processor), residing on another processor in the information processing system, accesses the fixed length block format disk, performs fixed length/variable length block format conversion, and executes an input/output request. The fixed length/variable length block format conversion is implemented by using a portion of a main memory as a disk cache. Since this technique permits the utilization of the small disk built in the chassis of the information processing system without the need for modifying the existing operating system or application programs, a consequent reduction in size and cost can be accomplished for the information processing system.

In the disclosed technique mentioned above, however, connected to the processor of the information processing system through the interface conforming to the fixed length block format is only the fixed length disk unit built in the chassis. No such interface conforming to the fixed length block format is provided for any storage external to the chassis, i.e., storage shared by other hosts such as other information processing systems.

FIG. 3 illustrates an example of an information processing system 301 which has a prior art internal disk unit. In conjunction with the system of FIG. 3, a method of processing a read/write request, when sent from the information processing system 301, will be described with reference to a flow chart of FIG. 4.

Step 401: The information processing unit 301 generates a CCW (read/write request) through an operating system running on a CPU 312. The generated CCW is stored in a main memory 311.

Step 402: A memory control processor 314 receives the CCW stored in the main memory 311, analyzes the CCW, and identifies a record specified by the read/write request.

Step 403: The memory control processor 314 classifies the specified request into a read request or a write request. The flow proceeds to step 404 when it is a read request, and to step 410 when it is a write request.

Step 404: It is determined whether or not the requested record is stored in a cache memory 311A. The flow proceeds to step 405 if stored (hit), and to step 408 if not (miss).

Step 405: The cache memory 311A is searched for the requested record to identify its stored location.

Step 406: The identified record is transferred to the main memory 311 at a storage location specified by the request.

Step 407: The completion of the request is informed.

Step 408: A memory area is assigned to store the requested record in the cache memory 311A.

If the read request is failed, i.e., if a cache miss occurs, a data format conversion mechanism 342 converts the read request command (CCW) sent in variable length block format to a command for an access interface conforming to the fixed length block format (SCSI command). The converted command is transmitted to an external storage device 315.

Step 409: A target track is read from the external storage device 315, and stored in the cache memory 311A. The memory control processor 314 waits for the processing to complete, and the flow proceeds to step 406 when the processing is completed.

Step 410: When the request is a write request, the data format conversion mechanism 342 converts the write request command (CCW) sent in variable length block format to a command for the access interface conforming to the fixed length block format (SCSI command). The memory control processor 314 determines in which part of the cache memory 311A the requested record should be stored.

Step 411: Write data is transferred from a storage location in the main memory 311 specified by the write request to the cache memory 311A.

Step 412: The memory control processor 314 requests internal storage device 315 to write therein the record written into the cache memory.

Step 413: The memory control processor 314 waits for the processing to complete, and the flow proceeds to step 407 when the processing is completed. The processing at step 412 may be executed after the completion of the write request has been informed, i.e., write-after may be employed. In FIG. 3, the main memory includes an area 311B for storing cache management information.

SUMMARY OF THE INVENTION

The foregoing internal disk control technique, when applied, enables an external storage system having a fixed length access interface to be connected to a general-purpose information processing system. Since such external storage devices are provided from a large number of vendors, the user can have a variety of options in accordance with the price, performance, reliability and so on. This means significant benefits to the user.

However, conventional information processing systems, which only make accesses conforming to the variable length block format, can only access storage systems having variable length access interface, but cannot access SCSI disks and so on which conform to the fixed length block format.

It is an object of the present invention to provide an method and apparatus for enabling at least one information processing system not having any interface conforming to a fixed length block format to access a disk unit associated with an interface conforming to the fixed length block format.

It is another object of the present invention to provide a method and apparatus for sharing a disk unit conforming to a fixed length block format between an information processing system having an interface conforming to the fixed length block format and an information processing system not having an interface conforming to the fixed length block format.

To achieve the above objects, in one aspect of the present invention, a processor in a particular information processing system for performing conversion between a fixed length block format and a variable length block format is connected to a processor in another information processing system for generating a CCW. The other information processing system does not have a processor for performing conversion between the fixed length block format and the variable length block format. The processor in the particular information processing system has a function of executing a CCW chain generated by the other information processing system in accordance with a variable length/fixed length block format conversion function.

The particular information processing system also has an interface conforming to the fixed length block format for a storage external to its chassis. Specifically, devices conforming to the fixed length block format may be connected to the particular information processing system for use as connectable devices externally attached to the chassis. A processor connected to a device which supports a fixed length interface with a storage external to the chassis has a function of executing a CCW chain generated by the other processor in accordance with the variable length/fixed length block format conversion function.

The particular information processing system thus connected interprets and executes CCW commands received from individual information processing systems. Specifically, the information processing systems communicate CCW commands one by one for controlling data transferred therebetween as well as for controlling a connected storage device conforming to the fixed length block format. A processor within the particular information processing system, dedicated to controlling the storage device conforming to the fixed length block format, sequentially interprets the commands, and converts each command to a SCSI command, when the storage device conforming to the fixed length block format is a SCSI disk unit, and issues the SCSI command to the SCSI disk unit to execute operations.

The foregoing feature enables an information processing system not having a fixed length block format interface to be connected to an information processing system having connected thereto a storage device including a fixed length block format interface, thereby providing a computer system which permits the information processing system not having a fixed length block format interface to access the storage device including the fixed length block format interface.

The processor responsible for the fixed length/variable length conversion in the information processing system having the fixed length block format interface performs the processing associated with the CCW. The present invention implements, in the processor responsible for the fixed length/variable length conversion, a mechanism for managing which information processing system is the source of a particular CCW, thereby providing a computer system which enables a plurality of information processing systems to respectively store commonly accessible data in a storage device including an interface conforming to the fixed length block format, for example, a disk array.

Other objects, features and advantages of the present invention will become apparent from the following description of the embodiments of the invention taken in conjunction with the accompanying drawings.

BRIEF DESCRIPTION OF THE DRAWINGS

FIG. 11 is a block diagram of an information processing network system illustrating another embodiment of the present invention.

DETAILED DESCRIPTION OF THE EMBODIMENTS

Embodiments of the present invention will hereinafter be described in detail with reference to the accompanying drawings.

Figure 1:
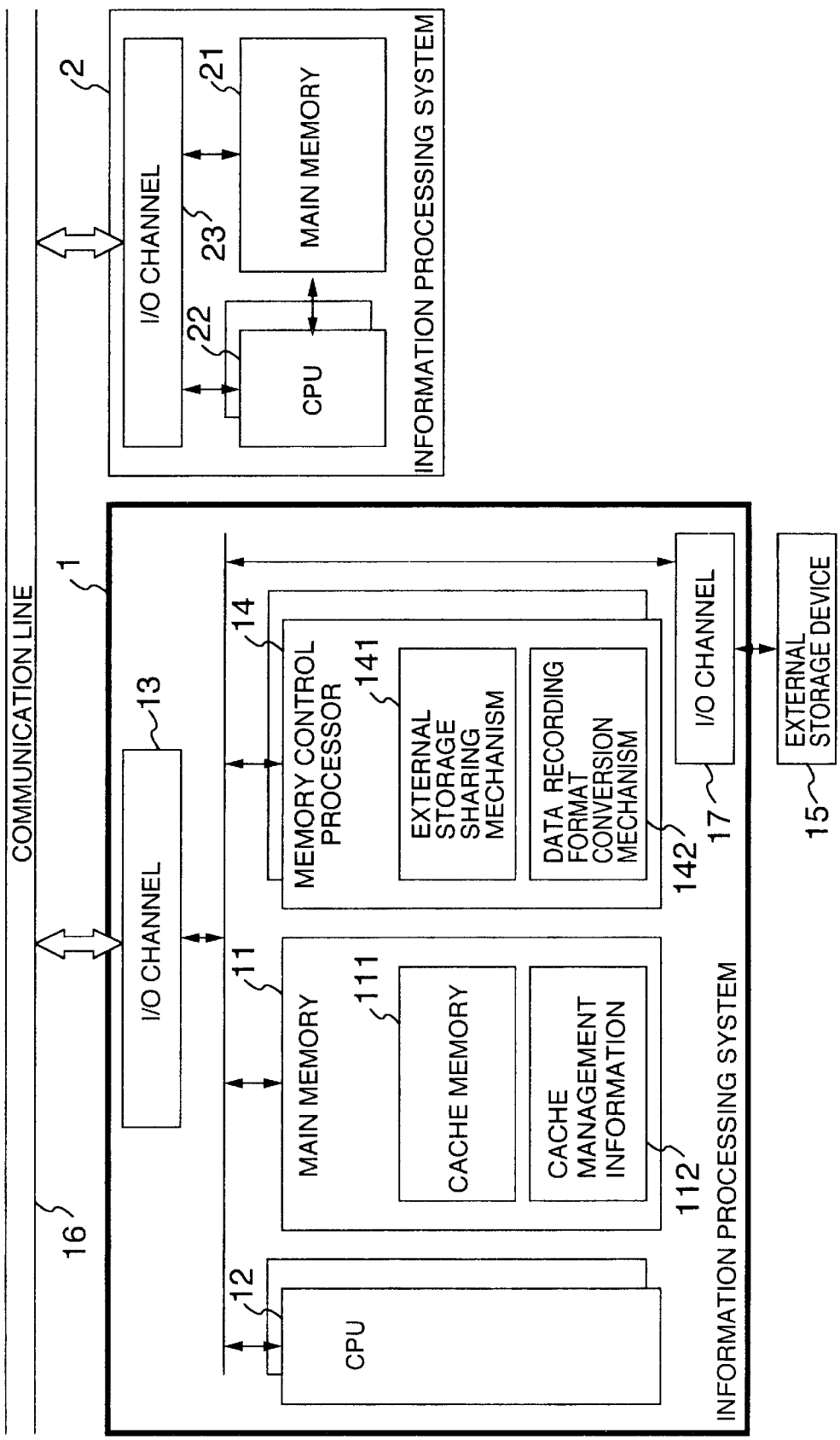
FIG. 1 is a circuit block diagram illustrating a basic concept according to one embodiment of the present invention.
Figure 2:
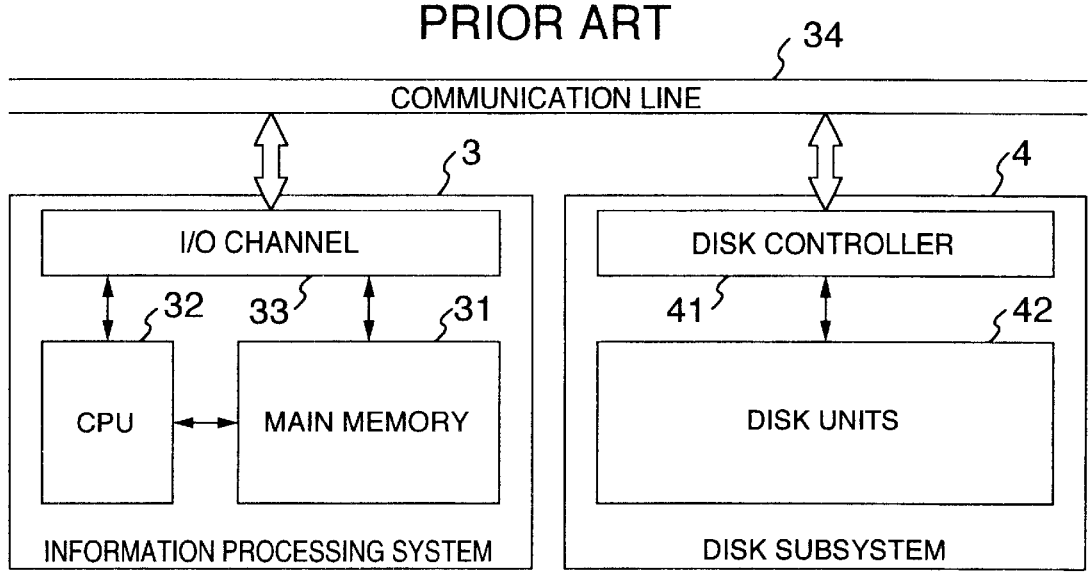
FIG. 2 is a block diagram illustrating a prior art information processing system including a disk unit.

FIG. 1 illustrates in block diagram form an embodiment of an information processing system which enables a data sharing feature according to the present invention. In FIG. 1, for purposes of illustration, the information processing system comprises an information processing system 2, and another information processing system 1 having connected thereto an external storage device conforming to a fixed length block format. As examples of the information processing systems 1, 2, MVS and VOS3 (manufactured by Hitachi Ltd.) may be contemplated. Alternatively, combined configurations of MVS and VOS3 (manufactured by IBM), VOS3 and VOS3, MVS and VOS3 may also be contemplated.

Figure 3:
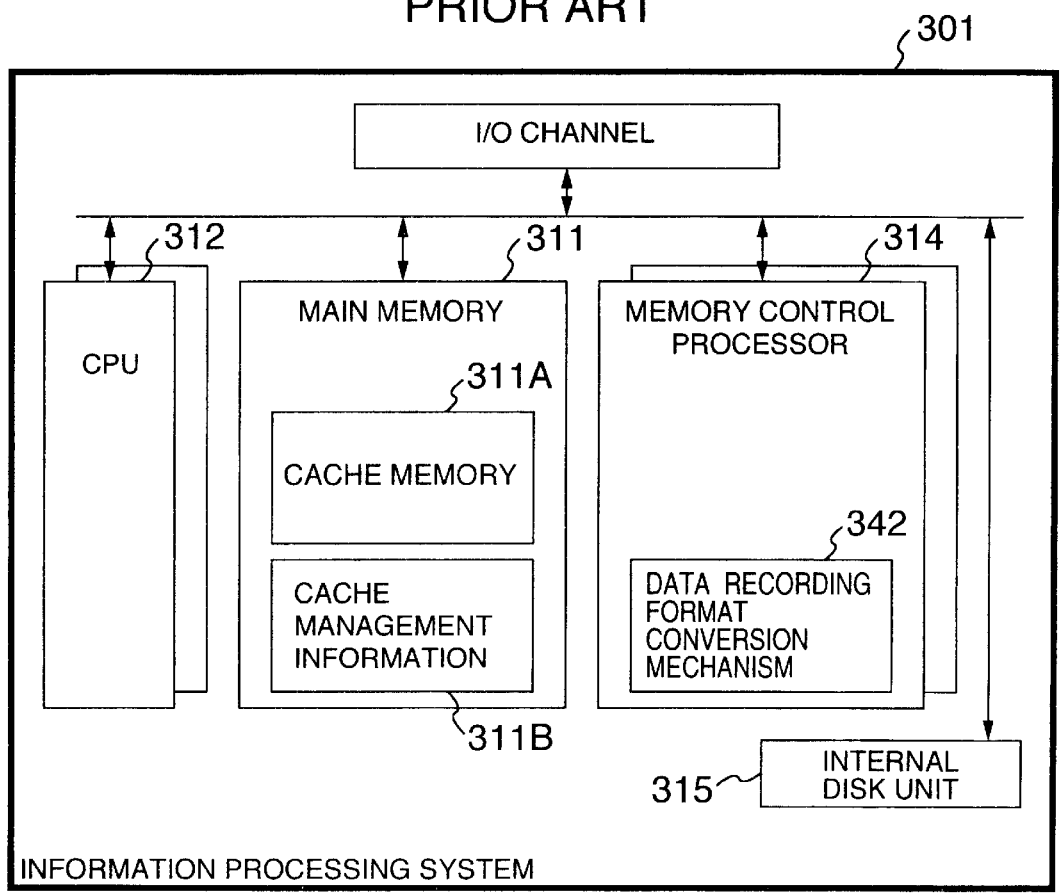
FIG. 3 is a block diagram illustrating a specific example of an information processing system including an external disk unit.
Figure 4:
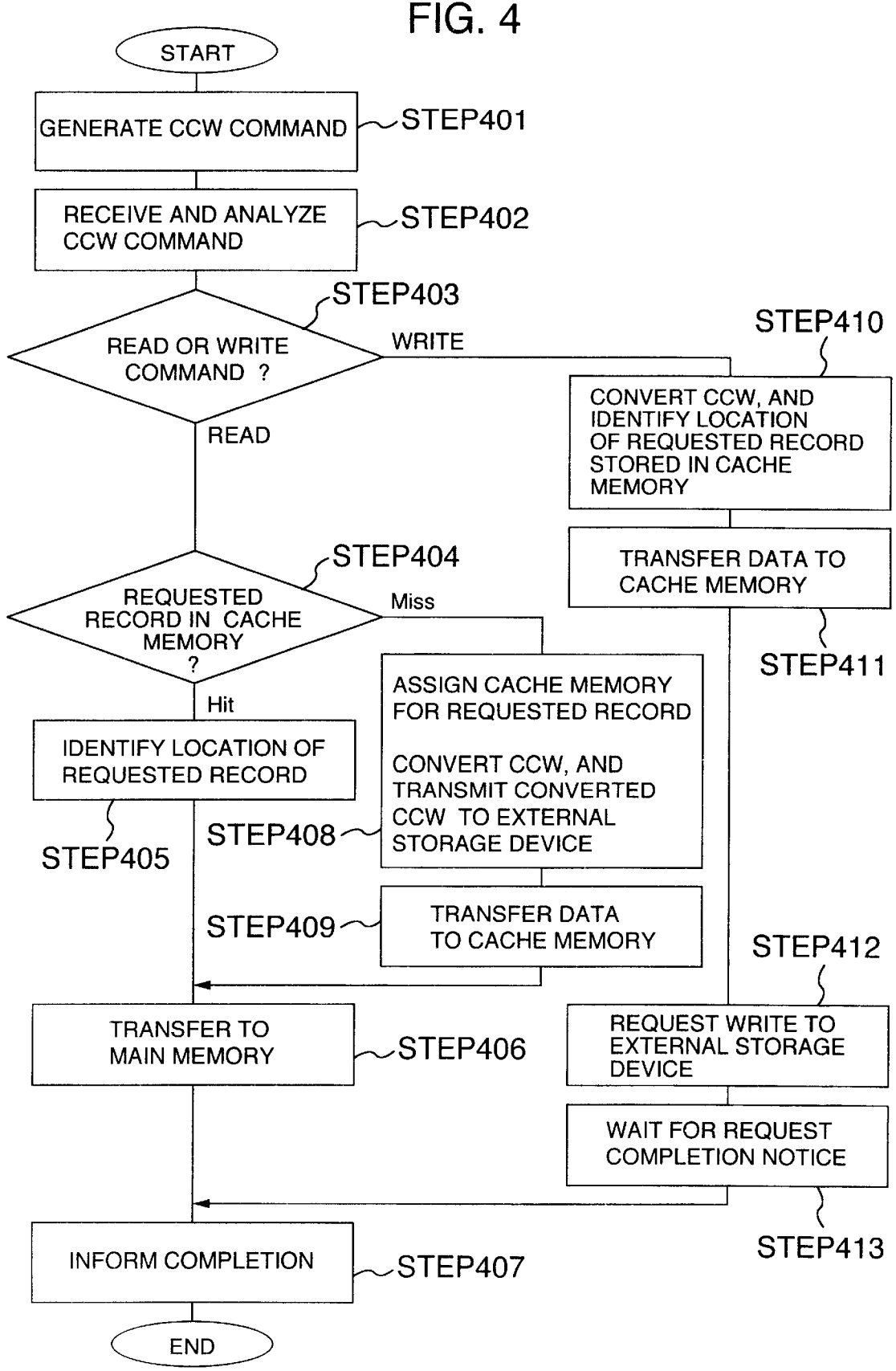
FIG. 4 is a flow chart illustrating the processing executed in the prior art information processing system including the internal disk unit in FIG. 3.

The information processing system 1 comprises one or more central processing units (hereinafter referred to as the "CPU") 12; a main memory 11; a communication unit (hereinafter referred to as the "I/O channel") 13 for controlling reception/transmission of information and data with information processing systems of another system; one or more memory control processors 14; an external storage device 15; and a communication unit (hereinafter referred to as the "I/O channel") 17 for controlling reception/transmission of information and data between the memory control processor 14 and the external storage device 15. This embodiment shows an configuration which has the external storage device 15 outside the information processing system 1. When the information processing system 1 has an internal disk unit as illustrated in FIG. 3, a variable length block format interface may be disposed in the information processing system 1.

The information processing system 2 comprises at least one central processing units (hereinafter referred to as the "CPU") 21; a main memory 22; and a communication unit (hereinafter referred to as the "I/O channel") 23 for controlling reception/transmission of information and data with information processing systems in another system. The I/O channel 23 and the I/O channel 13 are variable length access interfaces. The information processing system 1 and the information processing system 2 are interconnected through a communication line 16.

The main memory 11 has an area assigned to a cache memory 111 for use in input/output operations with the external storage device 15, in addition to areas for storing data and programs used by the respective CPUs. The main memory 11 also stores cache management information for managing data on the cache memory 111 in a storage area 112.

The memory control processor 14 has a data format conversion mechanism 142 which is a function of converting between a variable length block format and a fixed length block format. The memory control processor 14 also has an external storage sharing mechanism 141 which receives a read/write request command (CCW) directed to the external storage device 15, sent thereto from the CPU 12 or 22 through the variable length access interface, and converts this command conforming to the variable length access interface to a command conforming to the fixed length access interface (SCSI command) for transmission to the external storage device 15. The sharing mechanism 141 also controls transfer of input/output data between the external storage device 15 and the main memory 11.

The cache memory 111 holds data read from the external storage device 15 and data to be written by the CPU 12 into the external storage device 15. When data is stored in the cache memory 111, the data is stored in the same fixed length block format as that used for storage in the external storage device 15. The cache management information storage area 112 stores management information such as a cache assignment state and so on.

The external storage device 15 stores fixed length block formatted data, and has a fixed length access interface. As a fixed length access interface, SCSI is known by way of example. The external storage device 15 may be implemented by a single disk unit, or a RAID (Redundant Array of Inexpensive Disks) subsystem having a fixed length access interface.

The communication line 16 interconnects the information processing systems 1, 2 such that information can be exchanged at least between the memory control processor 14 and the CPU 22. As a practical example of the communication line 16, a fiber channel may be contemplated. While this embodiment shows an example in which the information processing systems 1, 2 are interconnected through the communication line 16, the information processing systems 1, 2 may be interconnected through the I/O channels 13, 23 without the communication line 16. Alternatively, they may be interconnected through the CPUs 12 and 22. Further alternatively, another processor may be provided between the I/O channel and the CPU of each information processing system such that the information processing systems 1, 2 are interconnected between the processors.

Figure 5:
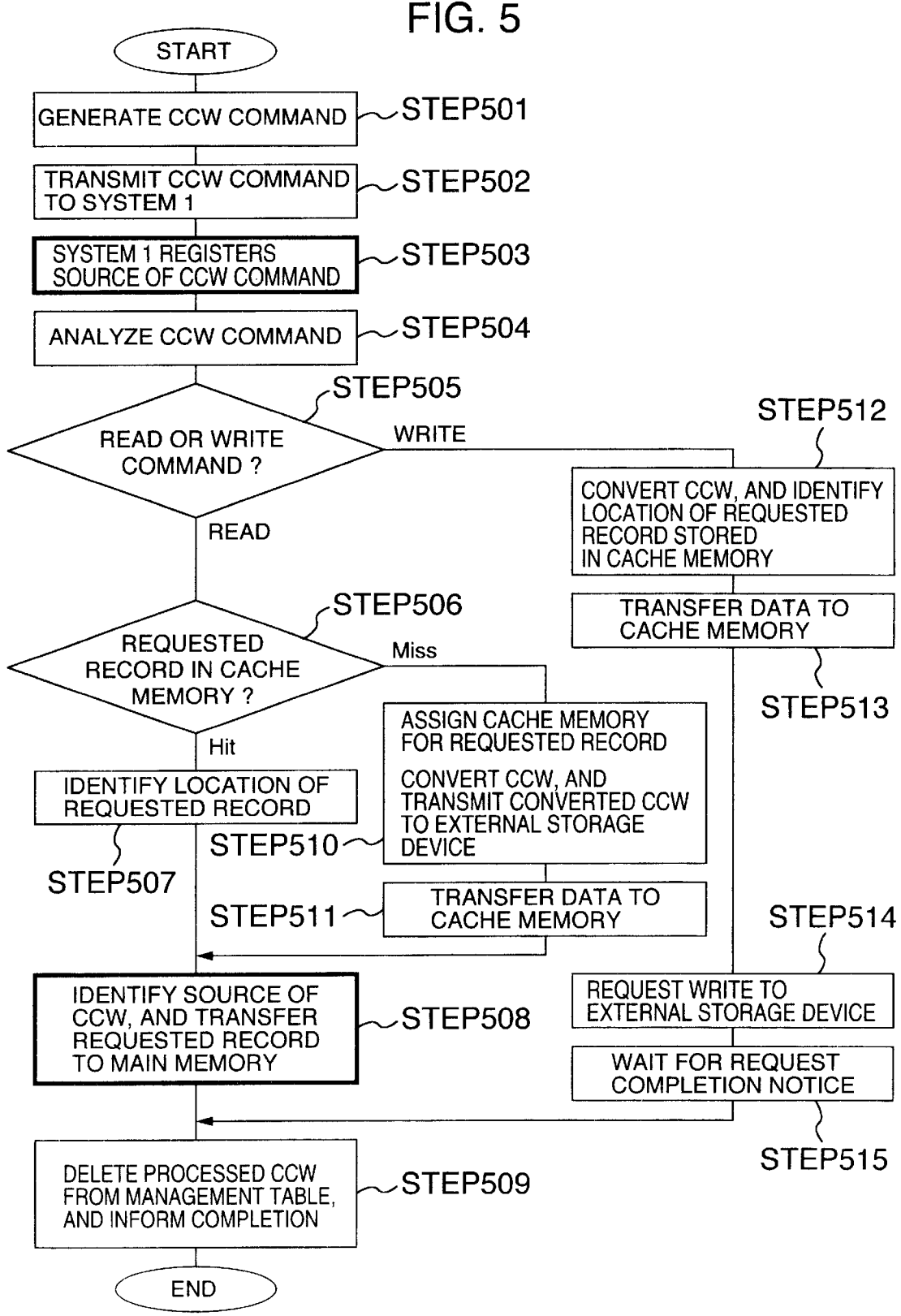
FIG. 5 is a flow chart illustrating the processing associated with a read/write command from the information processing system 2 in FIG. 1 according to an embodiment of the present invention.
Figure 6:
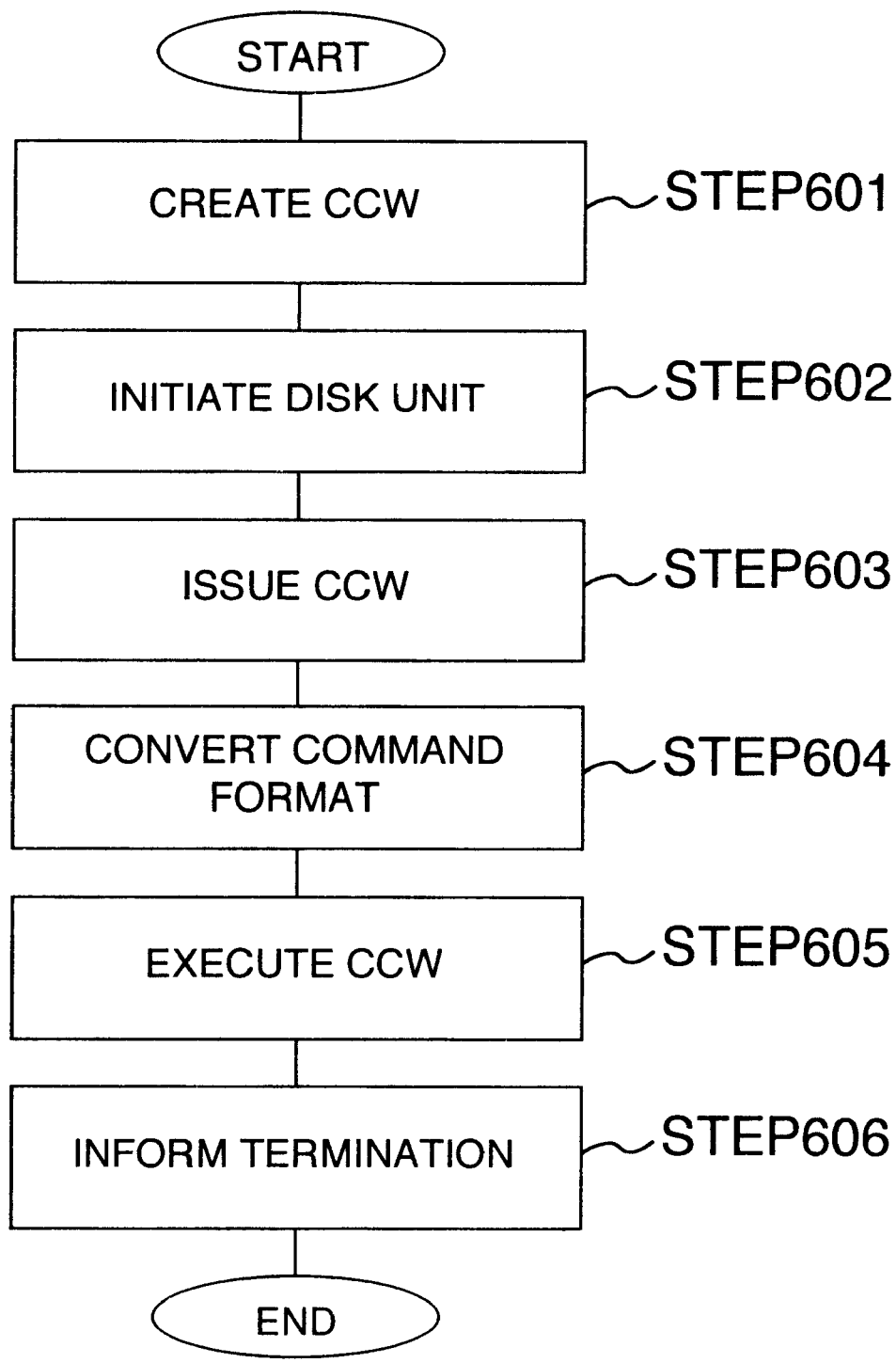
FIG. 6 is a flow chart illustrating the processing performed when an information processing system executes data read/write with an external disk unit in the prior art.
Figure 7:
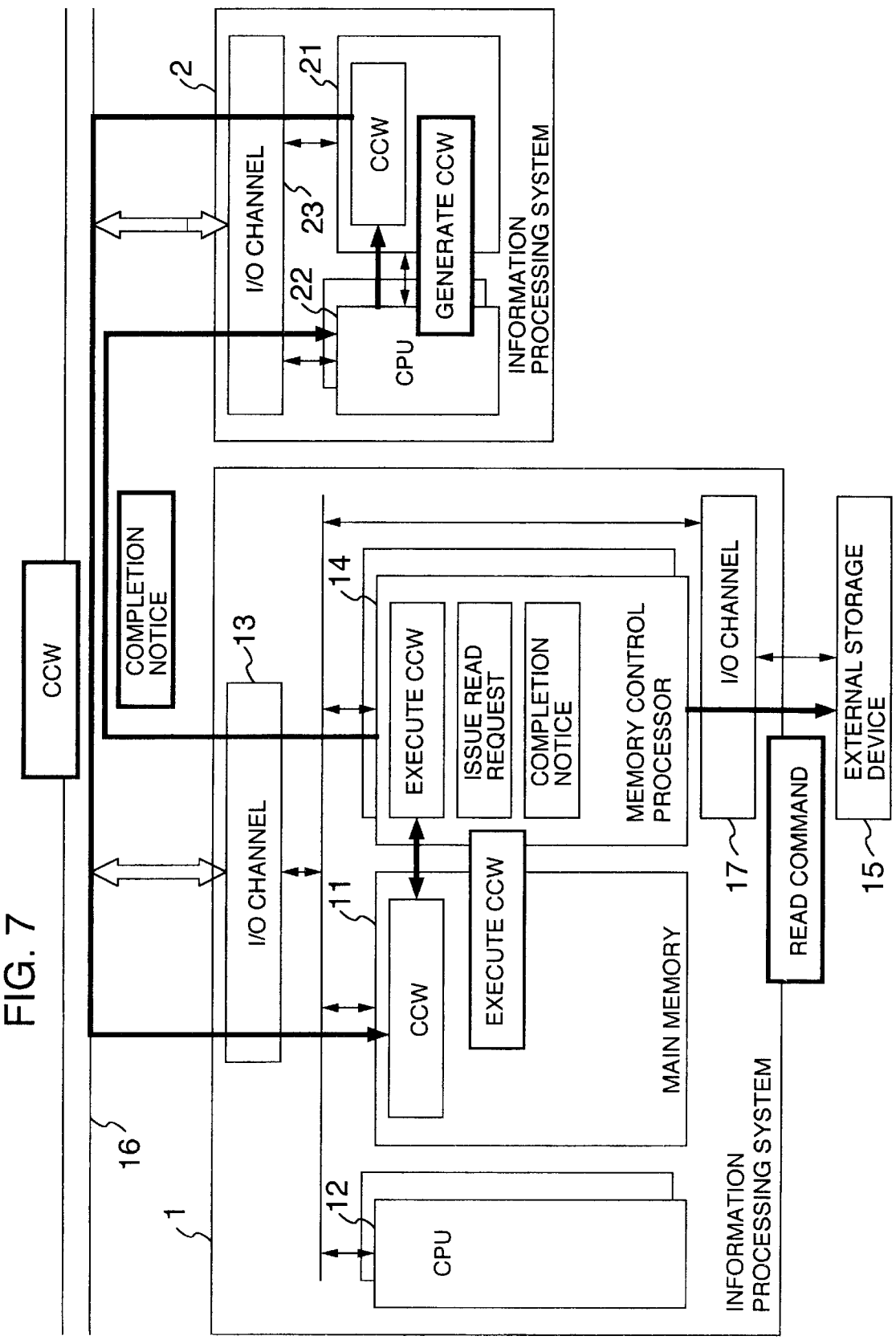
FIG. 7 is a diagram illustrating operations involved in receiving a CCW from another information processing system, and interpreting and executing the CCW.

Next, the operation of the system configured as illustrated in FIG. 1 will be described with reference to FIGS. 5, 7. Specifically, operations involved in the processing for a read/write request sent from the information processing system 2 will be described with reference to a flow chart of FIG. 5, while operations involved in transmission/reception of a CCW between the two systems will be described with reference to FIG. 7.

Step 501: The information processing system 2 generates a CCW through an operating system running on the CPU 22. The generated CCW is stored in the main memory 21.

Step 502: The CPU 22 initiates the I/O channel 23. The I/O channel 23 reads a CCW from a CCW chain from the main memory 21, and transmits the read CCW to the information processing system 1 through the I/O channel 23. Meanwhile, the I/O channel 23 is waiting for a notice indicative of the termination of the processing.

Step 503: The external storage sharing mechanism 141 of the system 1 receives the CCW through the I/O channel 13, recognizes that the CCW has been transmitted from the information processing system 2, and manages the CCW. As an exemplary managing method, the sharing mechanism 141 may have a CCW management table (a table in which command names, received times, transmission source names are registered) which describes a transmission source for each command, and manages information related to the CCW commands.

Step 504: The control processor 14 analyzes the CCW command.

Step 505: This step is processed in a manner similar to the aforementioned step 403. The flow proceeds to step 506 when the CCW is a read request, and to step 512 when the CCW is a write request.

Step 506: This step is processed in a manner similar to the aforementioned step 404. The flow proceeds to step 507 if a requested record resides in the cache memory (hit), and to step 510 if not (miss).

Step 507: This step is processed in a manner similar to the aforementioned step 405.

Step 508: The external storage sharing mechanism 141 identifies the request transmission source from the CCW management table. The storage location in the main memory 21 specified by the request is identified for the identified record. The memory control processor 14 initiates the I/O channel 13 which transfers the data stored in the cache memory 111 to the I/O channel 23 through the communication line 16. The I/O channel 23 stores the transferred data in the main memory 21.

Step 509: The external storage sharing mechanism 141 deletes the processed CCW from the CCW management table. The memory control processor 14 informs the system 2 of the completion of the request through the I/O channel 13, the communication line 16 and the I/O channel 23.

Step 510: This step is processed in a manner similar to the aforementioned step 408. After the data format conversion mechanism 342 converts the write request command (CCW) sent in variable length block format to a command for an access interface conforming to the fixed length block format (SCSI command), the converted command is transmitted to the external storage device 15 through the I/O channel 17.

Step 511: This step is processed in a manner similar to the aforementioned step 409. Upon termination of the transfer, the external storage device 15 informs the memory control processor 14 of the termination of the transfer through the I/O channel 17, followed by the flow proceeding to step 508.

Step 512: With the write command, this step is processed in a manner similar to step 410.

Step 513: Data to be written is transferred from the storage location in the main memory 21 specified by the write request to the cache memory 111.

Step 514: The write request to the external storage device 15 is processed in a manner similar to step 412.

Step 515: This step is processed in a manner similar to the aforementioned step 413. Upon receipt of a notice indicative of the completion of the request, the flow proceeds to step 509 where the sharing mechanism 141 executes the processing described above.

Figure 8:
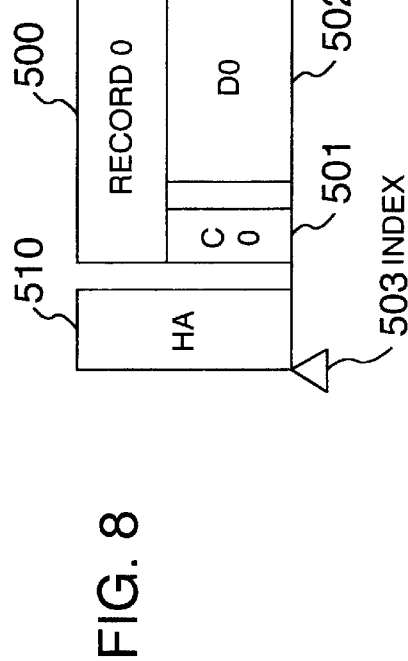
FIG. 8 is a diagram showing an example of a track format specification for data conforming to a variable length block format.

Next, a variable length block format of a track will be described with reference to FIG. 8.

A track is made up of a home address (hereinafter abbreviated as "HA") 510 and one or more records 500. The HA 510 is the first field located at the beginning of each track, and includes information such as a track number and so on. Each record 500 may include one or more fields, i.e., a count part 501, a data part 502, and in some cases a key part (not shown) before the data part. The count part 501 is a fixed length field which stores the address of the associated record 500, the length of subsequent fields (the abovementioned data part 502 and key part), and so on. Each record 500 is permitted to have a variable length, in other words, the data part 502 may differ in length from one record 500 to another. For this reason, the length of the key part and the data part 502 of the record is stored in the count part 501, such that the length of each field in the record 500 can be found from the count part 501. The address of the record 500 is indicated by a combination of a cylinder number, a head number and a record number, i.e., a combination of sequential numbers given from the beginning of the track. While the track has a fixed length, the record has a variable length, so that the number of records included in each track is variable.

Figure 9:
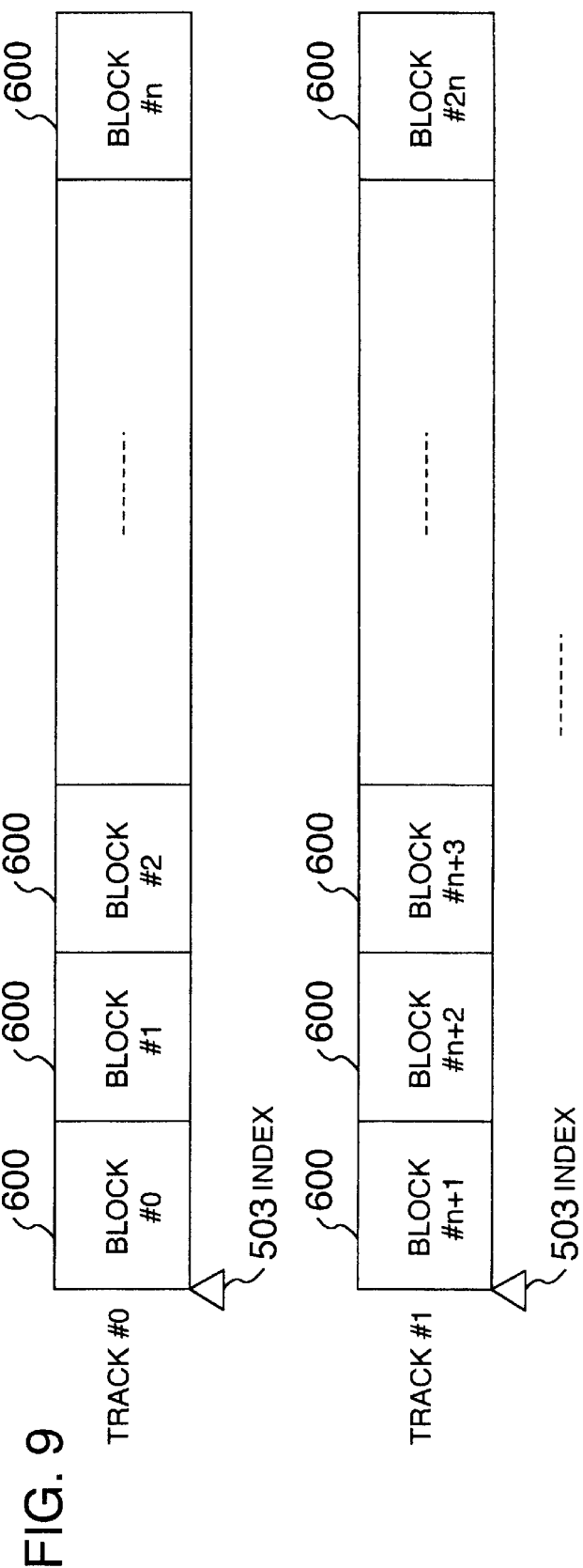
FIG. 9 is a diagram showing an example of a track format specification for data conforming to a fixed length block format.

Next, a track format for the fixed length recording will be described with reference to FIG. 9.

In a fixed length storage device, each track is composed of areas having a predefined fixed length (hereinafter this area is referred to as the "block"), each of which is uniquely numbered within the storage device. For accessing an area within the storage device, therefore, it is only required to specify the number of the first block 600 in the area and the number of blocks 600 subsequent thereto.

Figure 10:
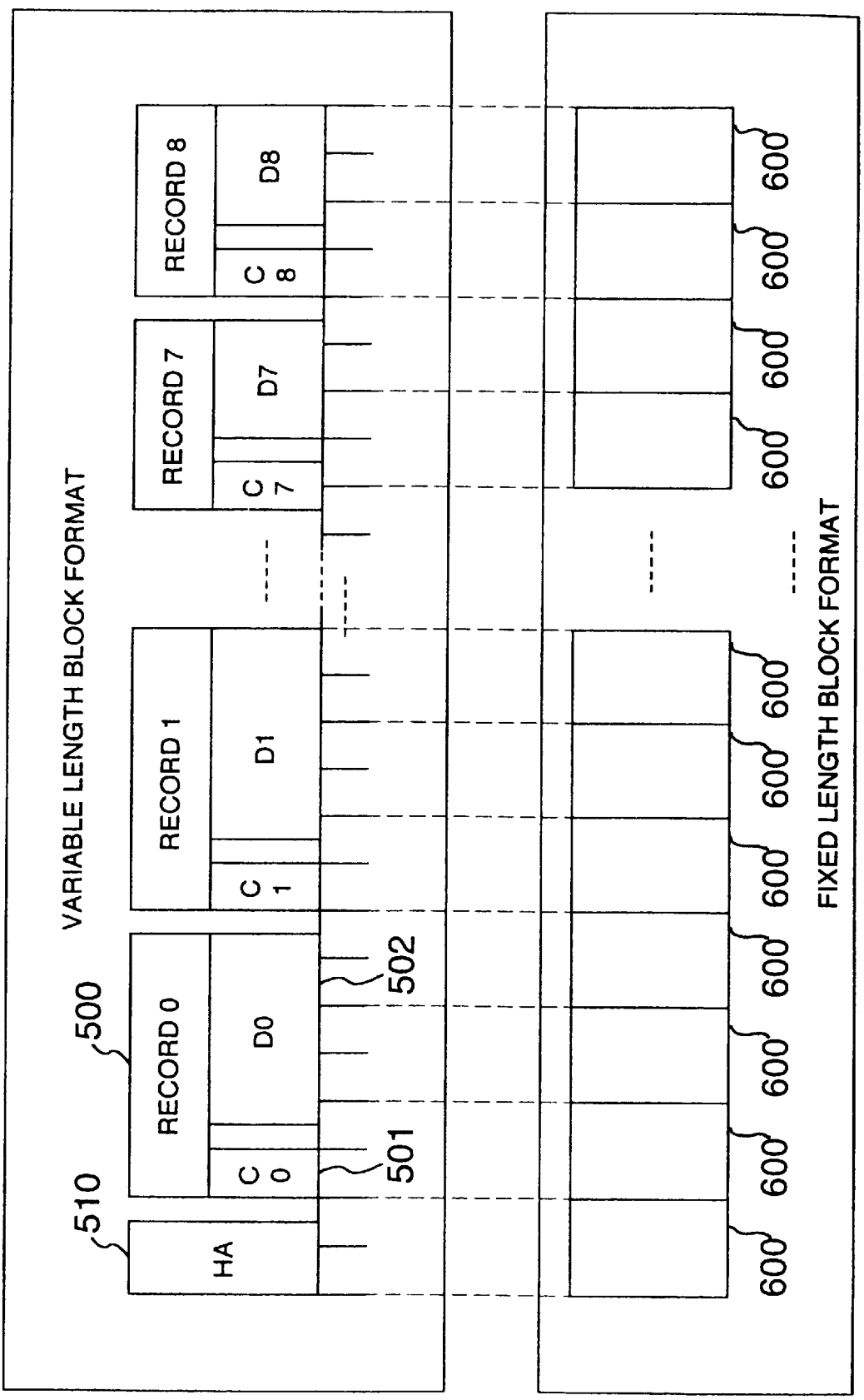
FIG. 10 is a diagram showing a format conversion method for converting data between the variable length block format and the fixed length block format.

Next, a method of converting variable-length block formatted data to fixed length block formatted data will be described with reference to FIG. 10.

Prior to the format conversion, each of tracks represented in variable length block format is divided into areas equal in length to the fixed length block 600, and the head area of the first track indicated by cylinder number 0 and head number 0 is assigned to the first block 600 indicated by number 0. Subsequently, subsequent areas on the track are assigned to the subsequent blocks 600. When all areas on the first track have been assigned, the head area of the next track, i.e., a track indicated by cylinder number 0 and head number 1, is assigned to the subsequent block 600. In a similar manner, all areas of each track are subsequently corresponded to respective blocks 600.

Since each track has a fixed length, the number of fixed length blocks accommodated in one track is defined by dividing the capacity of the track by the capacity of the block. Therefore, the number assigned to the first one of blocks 600 which store a certain track can be found from its track address by: (the cylinder number × the number of heads + the head number) × the total number of blocks per track.

The format conversion between the variable length block format and the fixed length block format can be accomplished by the foregoing method. It should be noted that the foregoing is a mere example of the format conversion, and other conversion methods may also be used for this purpose.

FIG. 11 illustrates another embodiment. In place of the I/O channel 17 in FIG. 1, a network 18 is used to connect a CPU 12 within an information processing system 1; a main memory 11; a communication unit 13 for controlling transmission/reception of information and data to/from information processing systems in another system; and a memory control processor 14 to an external storage device 15. As an example of the network 18, SAN (Storage Area Network) is contemplated.

Likewise, in this embodiment, connections among the components except for that with the network 18 are identical to those in the embodiment of FIG. 1, so that it will be understood that the transmission/reception of commands and data to/from the external storage device 15 are also basically identical to the foregoing embodiment.

As described above, the information processing system 1 interprets a command received from the information processing system 2 to enable the same to have an access to the external storage device 15 connected to the information processing system 1, so that an operating system on the information processing system 2 can share data on the external storage device 15 by equivalently issuing CCWs without the need for taking into account whether the external storage device to be accessed is an external storage device which has a conventional variable length access interface or an external storage device which has a fixed length access interface.

According to the present invention, it is possible to share an external storage device conforming to the fixed length block format, connected to a general-purpose information processing system having a conversion mechanism between the variable length block format and the fixed length block format, among conventional information processing systems which only have a variable access interface. The conventional information processing systems can share the external storage device without having a format conversion mechanism between the variable length block format and the fixed length block format. In this event, this sharing feature can be realized using existing systems only by providing the information processing systems with a sharing mechanism without the need for any modifications to the systems including the operating systems, application programs and hardware configurations.

What is claimed is:

1. A computer system comprising at least one first information processing system having one or more central processing units (CPUs), a main memory and a communication unit for communicating with other information processing systems, and a second information processing system having one or more central processing units (CPUs), a main memory, a communication unit for communicating with other information processing systems, an interface for connecting one or more external storage devices for storing data conforming to a fixed length block format, and a control unit for said storage device, said computer system comprising:

a communication line for interconnecting said first and second information processing systems;

an interface for connecting said control unit in said second information processing system to said external storage device; and wherein said control unit manages access requests to said external storage devices from said CPUs of said first and second information processing systems, and converts a read/write request, issued from said CPUs of said first information processing system to said storage device conforming to a variable length block format, from said variable length block format to a fixed length block format.

2. A computer system according to claim 1, wherein said control unit transfers data stored in said external storage to said main memory of said second information processing system in accordance with a read request sent from said first information processing system to said second information processing system.

3. A computer system according to claim 1, wherein said control unit stores data from said first information processing system to said main memory of said second information processing system in accordance with a write request sent from said first information processing system, and transfers the data stored in said main memory of said second information processing system to said external storage device.

4. A computer system according to claim 2, wherein said external storage device is connected to said second information processing system through an input/output channel or through a network.

5. In a computer system comprising a plurality of information processing systems each having at least one central processing unit (CPU), a main memory, and a communication unit for communicating with other information processing systems, a communication unit for providing communications among said plurality of information processing systems, and at least one external storage device for storing data conforming to a fixed length block format, said computer system adapted to share said external storage device among said plurality of information processing systems, said plurality of information processing systems including a particular information processing system adapted for connection to said external storage device, said particular information processing system comprising:

external storage sharing means for managing accesses to said external storage device from the remaining information processing systems and said particular information processing system, and for converting a read/write request from the CPU of said information processing system to said storage device conforming to a variable length block format, from said variable length block format to a fixed length block format; and processing means for accessing said external storage device in accordance with a request conforming to the fixed length block format converted by said sharing means.

6. A particular information processing system according to claim 5, wherein said sharing means includes means for registering attributes of an information processing system which has issued an access request to said external storage device, and said sharing means performs said access management using said registering means.

7. A particular information processing system according to claim 5, connected to said external storage device through a channel interface or a network.

8. In a computer system comprising a plurality of information processing systems each having at least one central processing unit (CPU), a main memory, and a communication unit for communicating with other information processing systems, a communication unit for providing communications among said plurality of information processing systems, and at least one external storage device for storing data conforming to a fixed length block format, said computer system adapted to share said external storage device among said plurality of information processing systems, a method of configuring said computer system comprising the steps of:

specifying at least one information processing system configured for connection to said external storage device from said plurality of information processing systems;

providing said specified information processing system with external storage sharing means for managing accesses to said external storage device from the remaining information processing systems and said specified information processing system, and for converting a read/write request from the CPU of said information processing system to said storage device conforming to a variable length block format, from said variable length block format to a fixed length block format; and providing processing means for accessing said external storage device in accordance with a request conforming to the fixed length block format converted by said sharing means.

9. A configuring method according to claim 8, further including the steps of registering attributes of an information processing system which has issued an access request to said external storage device through said sharing means, and performing said access management in accordance with the registration.

10. A configuring method according to claim 8, further including the step of connecting said specified information processing system to said external storage device through a channel interface or a network.

\* \* \* \* \*